June 3, 1958     F. H. EVANS     2,837,200
BAR AND BILLET TURNING APPARATUS
Filed July 16, 1956     4 Sheets-Sheet 1
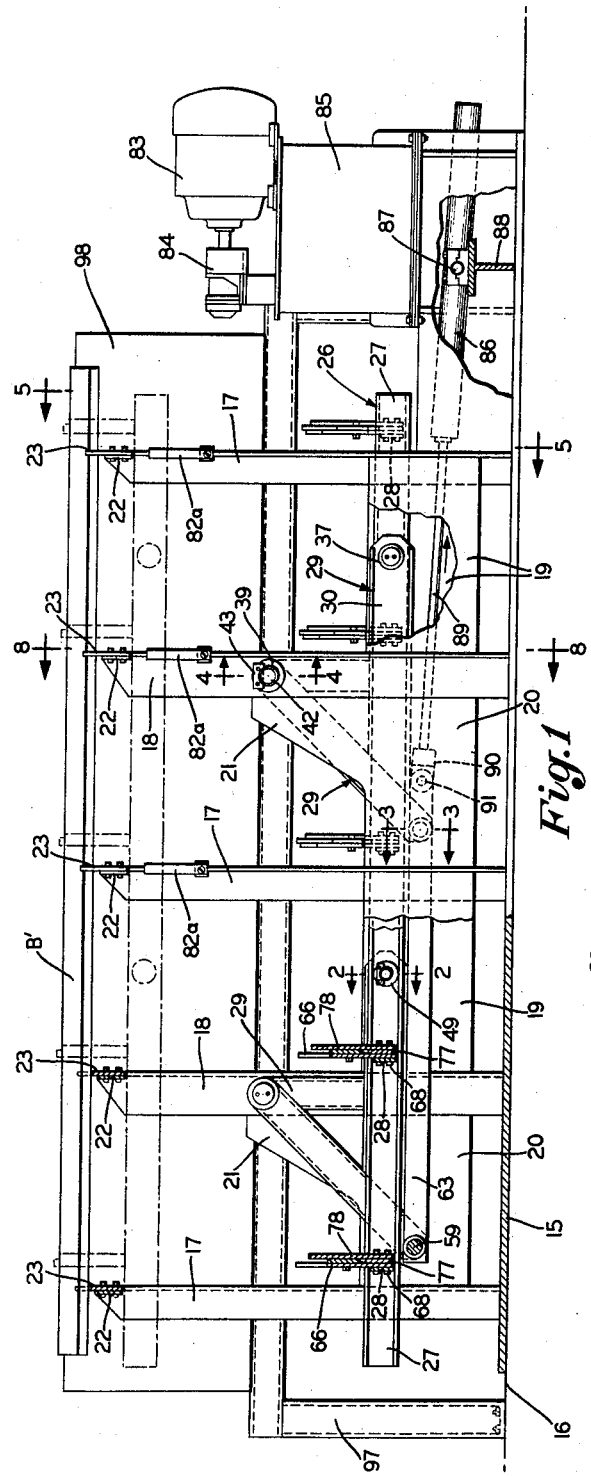
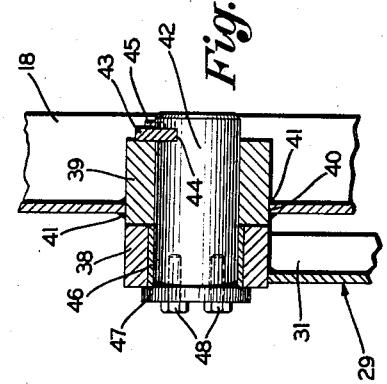
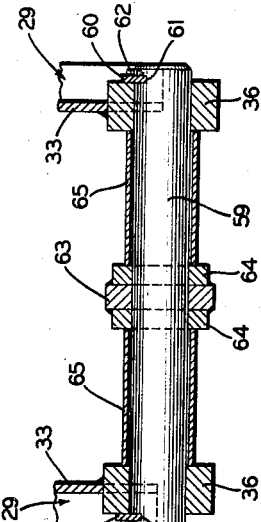
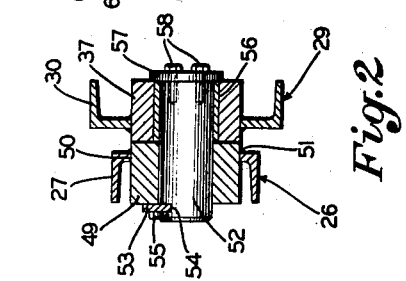
INVENTOR.
*Frederick H. Evans*
BY
*Frease & Bishop*
ATTORNEYS June 3, 1958        F. H. EVANS        2,837,200
BAR AND BILLET TURNING APPARATUS
Filed July 16, 1956        4 Sheets-Sheet 2
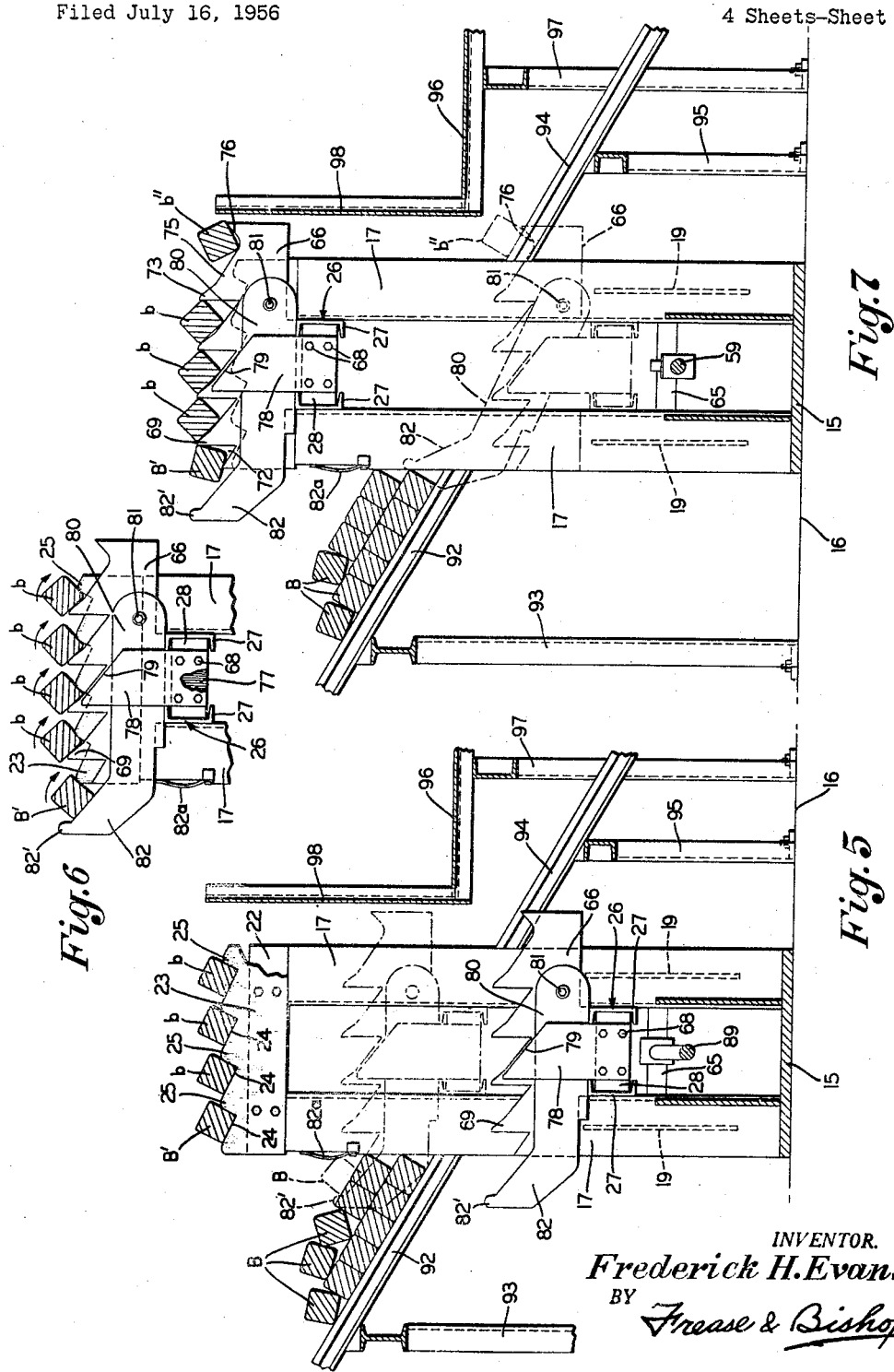
INVENTOR.
Frederick H. Evans
BY Frease & Bishop
ATTORNEYS June 3, 1958

F. H. EVANS 2,837,200

BAR AND BILLET TURNING APPARATUS

Filed July 16, 1956

INVENTOR.
*Frederick H. Evans*
BY
*Frease & Bishop*

ATTORNEYS

June 3, 1958
F. H. EVANS
2,837,200
BAR AND BILLET TURNING APPARATUS
Filed July 16, 1956
4 Sheets-Sheet 4
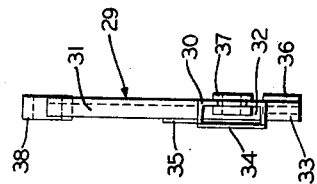
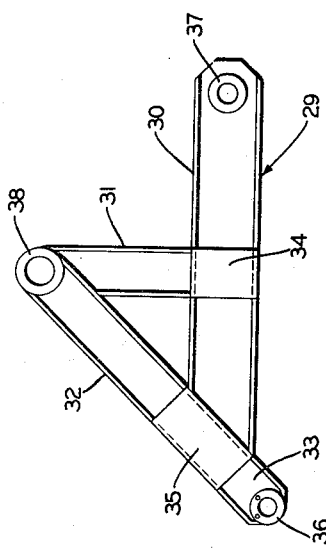
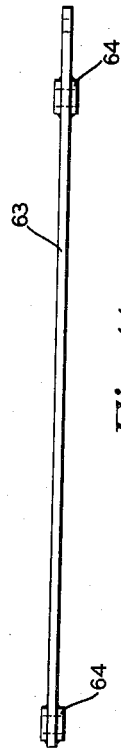
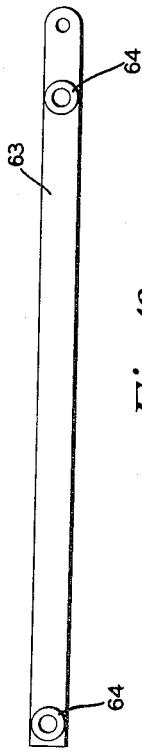
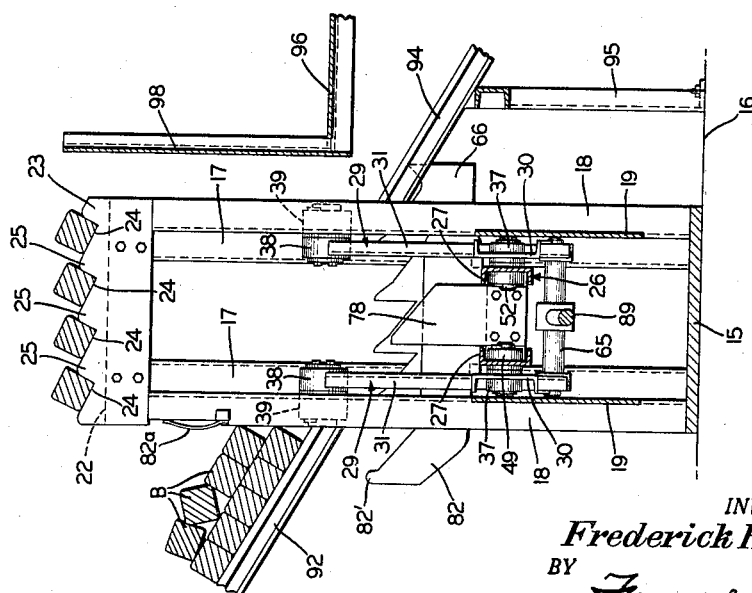
INVENTOR.
Frederick H. Evans
BY
Frease & Bishop
ATTORNEYS United States Patent Office 2,837,200
Patented June 3, 1958

2,837,200

BAR AND BILLET TURNING APPARATUS

Frederick H. Evans, Massillon, Ohio, assignor to Evans Enterprises, Inc., Massillon, Ohio, a corporation of Ohio Application July 16, 1956, Serial No. 597,976

15 Claims. (Cl. 198—33)

The invention relates to apparatus for handling bars, billets and the like, and more particularly to a machine for turning bars, billets and similar articles, so as to successively present each of the faces thereof for inspection, chipping, grinding or the like.

Bars, billets and the like, after being rolled, are inspected and marked for any chipping, grinding or the like which may be found necessary. For this purpose it is necessary that each bar or billet be turned so as to successively present each of its longitudinal faces for such inspection, chipping or the like.

Under present steel mill practice, this turning of the bars or billets is performed manually, this being a time and labor-consuming operation which adds to the expense of production.

It is therefore an object of the invention to provide an apparatus for quickly turning bars and billets to successively present the longitudinal faces thereof for inspection and cleaning.

Another object is to provide apparatus for turning bars and billets of square, round, or other cross-sectional shape.

A further object is to provide such an apparatus which will simultaneously turn a plurality of bars or billets with each operation of the apparatus.

Another object is to provide apparatus of the character referred to in which bars or billets are picked up, one at a time, from a supply table on which they may be received from the bar or billet mill, and are successively turned as they are passed through the turning apparatus, and then deposited upon a discharge table or conveyor.

A further object is to provide apparatus of this type including a plurality of toothed turn plates over which the bars or billets are successively turned by means of a plurality of vertically reciprocating, toothed lift plates.

The above and other objects, apparent from the drawings and following description, may be attained, the above described difficulties overcome and the advantages and results obtained, by the apparatus, construction, arrangement and combinations, sub-combinations and parts which comprise the present invention, a preferred embodiment of which, illustrative of the best mode in which applicant has contemplated applying the principle, being set forth in detail in the following description and illustrated in the accompanying drawings.

In general terms, the invention may be described as comprising an elongated frame having a plurality of spaced, transversely disposed, toothed turn plates mounted in the top thereof in position to receive a plurality of spaced, parallel bars or billets.

A vertically movable carriage is mounted in the machine and has thereon a series of lift arms adapted to remove bars or billets, one at a time, from an adjacent supply table, and convey them upward to the turn plates.

Associated with the lift arms are a plurality of toothed lift plates which cooperate with the turn plates to move the bars or billets progressively across the turn plates, from one notch to another, and to give them a quarter turn with each operation.

Means is provided upon the lift plates for receiving the bars, one at a time, as they pass off of the turn plates, and to deliver them onto a discharge table or conveyor.

A platform is located at the discharge side of the machine, in such positon that a workman standing thereon may inspect the several longitudinal faces of the bars or billets, as they are turned by the apparatus, and may perform any chipping or other operation required thereon.

Having thus briefly described the invention, reference is now made to the embodiment thereof illustrated in the drawings, in which;

Fig. 1 is a side elevation, with parts broken away, of a billet or bar turning apparatus embodying the invention, showing the carriage in full lines, in the initial position, and in broken lines, in the operated position;

Fig. 2 is an enlarged, fragmentary sectional view through a pivotal connection of one of the carriage lifting arms with the carriage, taken as on the line 2—2, Fig. 1;

Fig. 3 is an enlarged, fragmentary sectional view through the pivotal connection between the drive bar and one pair of the carriage lifting arms; taken as on the line 3—3, Fig. 1;

Fig. 4 is an enlarged, fragmentary sectional view of the pivotal connection of one of the carriage lifting arms on an upright frame member of the machine; taken as on line 4—4, Fig. 1;

Fig. 5 is a transverse sectional view through the apparatus, taken on the line 5—5, Fig. 1, showing the parts in the normal or initial position, and showing, in broken lines, the carriage partly raised, indicating the manner in which a bar or billet is picked up from the supply table by the lift arms;

Fig. 6 is a transverse sectional view of the upper portion of the machine, with the carriage near the upper limit of its movement, showing the beginning of a turning movement of the bars or billets;

Fig. 7 is a transverse sectional view similar to Fig. 5, with the carriage at the height of its movement, with a turning movement of the bars or billets completed and one bar or billet removed from the turning plates and deposited on the ends of the lifting plates, and showing, in broken lines, the carriage partially lowered with one bar or billet deposited upon the discharge table;

Fig. 8 is a transverse sectional view through the machine, taken as on the line 8—8, with the parts in the initial or normal position shown in Fig. 5;

Fig. 11 is a detached side elevation of one of the lifting arms for the carriage;

Fig. 12 is an edge elevation of the lifting arms shown in Fig. 11;

Fig. 13 is a detached side elevation of the carriage drive bar;

Fig. 14 is an edge elevation of the drive bar; and

Figure 9:
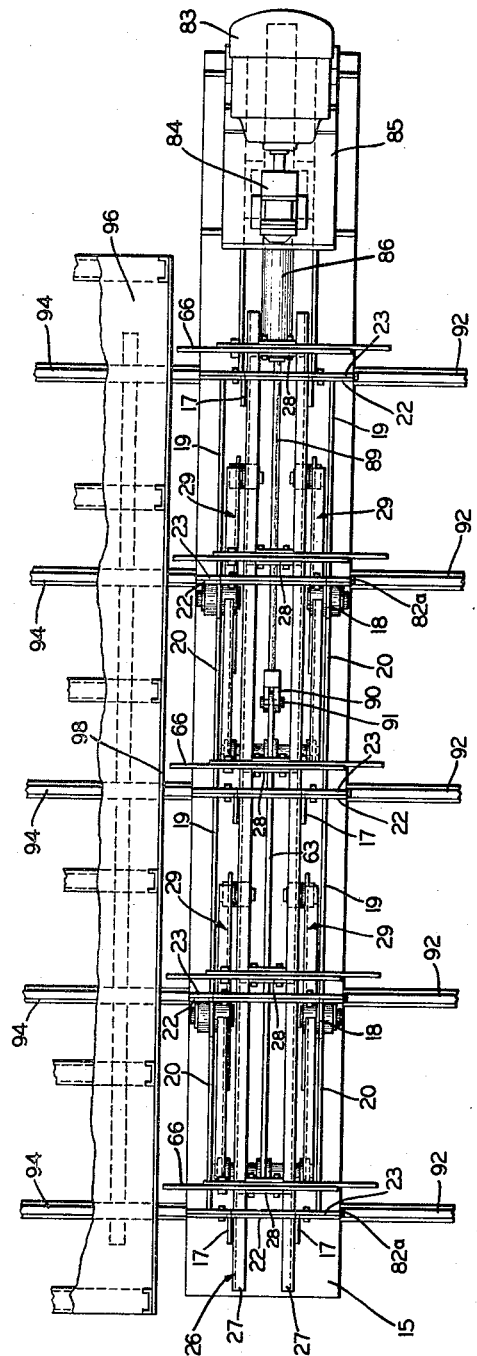
Fig. 9 is a top plan view of the machine.

Referring now to the embodiment of the invention illustrated in the drawings, in which similar numerals refer to similar parts throughout the several views, the machine includes a frame which may be mounted upon a base plate 15, which may be placed upon the floor indicated at 16.

The frame includes a plurality of spaced pairs of uprights 17 and 18 located at spaced points throughout the length of the base plate 15 at opposite edges thereof. These uprights may be in the form of angle members, the uprights 17 being located at opposite ends and at the center and the uprights 18, which are located intermediate the center and each end.

Each of these uprights is in the form of an angle member having a relatively narrow flange and a relatively wide flange. The uprights 18 are positioned in the frame with the wider flange disposed longitudinally of the frame, while the uprights 17 are shown with the wider flange disposed transversely of the frame.

Longitudinally disposed bracing plates 19 and 20 are welded or otherwise connected to the upright members 17 and 18, the plates 20 having upwardly disposed extensions 21 welded or otherwise attached to the uprights 18, for further bracing the same for a purpose to be later explained.

Each pair of uprights 17 and 18 are connected at their upper ends by a transverse plate 22 to which is bolted or otherwise attached a notched or toothed turn plate 23 of greater height than the plate 22. The upper edge of each turn plate 23 has a spaced series of diagonal notches 24 therein separated by the round-nosed teeth or projections 25.

Figure 10:
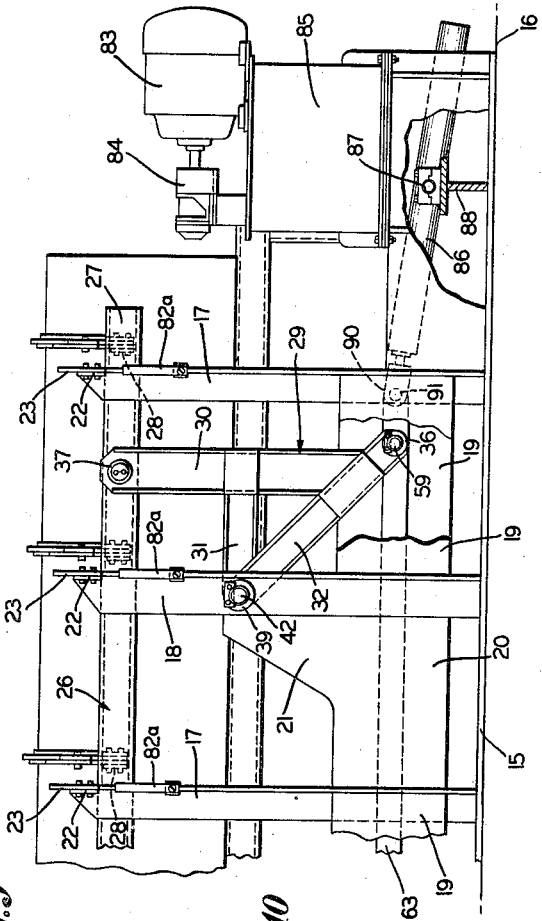
Fig. 10 is a fragmentary side elevation of a portion of the machine, showing the carriage in raised position.
Figure 15:
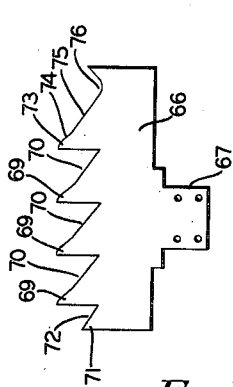
Fig. 15 is a detached front elevation of one of the lift plates.

A carriage, indicated generally at 26, is located longitudinally within the frame and mounted to swing upwardly from the initial or normal lowered position, as shown in Figs. 1, 5 and 8, to the raised position shown in Figs. 7 and 10. This carriage comprises a pair of spaced parallel channel members 27 connected at intervals by the transversely disposed plates 28. The carriage is suspended within the frame so as to swing upward from the lowered or initial position shown in Figs. 1, 5 and 8 to the fully raised position shown in Figs. 7 and 10.

For the purpose of mounting the carriage within the frame so that it will swing in the manner above described, a plurality of lifting arms, indicated generally at 29, are provided. Each of these lifting arms is of substantially the shape of a figure 4, as best shown in Fig. 11 and comprises the normally horizontal bar 30, the vertical bar 31 extending upward from substantially the center of the horizontal bar 30 and the diagonal bar 32 connecting the upper end of the vertical bar 31 and one end of the horizontal bar 30 and extending a short distance below the same, as indicated at 33.

The bars 30, 31 and 32 forming the lifting arm 29 are of generally channel cross-sectional shape. A plate 34 is welded across the flanges of the horizontal bar 30 adjacent the point of connection of the vertical bar 31, and a plate 35 is welded across the flanges of the diagonal bar 32 adjacent the point of connection to the horizontal bar 30 for the purpose of strengthening the structure at these points.

A bearing boss 36 is attached to the extension 33 of the diagonal bar 32, a bearing boss 37 is attached to the opposite end of the horizontal bar 30, and a bearing boss 38 is attached to the joined upper ends of the vertical bar 31 and diagonal bar 32.

One of the lifting arms 29 is pivotally mounted upon each of the uprights 18. For this purpose a bearing boss 39 is located through a suitable opening 40 in the wide flange of each upright 18 and rigidly connected thereto as by welding indicated at 41.

A journal member 42 is located through the bearing boss 39 and held against movement therein as by the key plate 43 located in the groove 44 in the journal member and attached to the bearing boss 39 as by bolts 45.

A bushing 46 is located within the bearing boss 38 of the lifting arm 29 to receive the journal member 42 and a cap plate 47 is attached to the adjacent end of the journal member 42 as by screws 48 and overhangs the adjacent end of the bearing boss 39 to retain the same upon the journal member. Each lifting arm 29 is thus pivotally mounted upon the corresponding upright 18.

The bearing boss 37 of each lifting arm 29 is pivotally connected to the carriage. For this purpose a bearing boss 49 is provided in each channel member 27 of the carriage in proper position for forming each of these pivotal connections. Each bearing boss 49 is located through an aperture 50 in the channel member 27 and welded thereto as indicated at 51.

A journal 52 is mounted in the bearing boss 49 and held against movement therein by the key 53 located in the transverse notch 54 of the journal and attached to the bearing boss 49 as by bolts 55. This journal extends through the bushing 56 in the bearing boss 37 of the lifting arm 29, and a cap plate 57 is attached to this end of the journal, as by bolts 58, and overlaps the adjacent end of the bearing boss 37 so as to prevent end movement thereof upon the journal.

A shaft 59 is journalled through the bearing bosses 36 on the extensions 33 of each pair of lifting arms 29 and is held against end movement relative thereto by means of the transversely disposed key plates 60 located in notches 61 in opposite end portions of the shaft 59 and attached to the corresponding bearing bosses 36 as by bolts 62.

The two pairs of lifting arms 29 are pivotally connected together by means of a driving bar 63 having bearing bosses 64 thereon through which the respective shafts 59 are located. Spacer sleeves 65 are located between each bearing boss 64 of the driving bar and the corresponding bearing boss 36 of the lifting arms, as best shown in Fig. 3.

A plurality of toothed lifting plates 66 are mounted upon the carriage, one of these lifting plates being connected to each of the transversely disposed plates 28 of the carriage. For this purpose each lifting plate 66 has a depending central shank 67 attached to the corresponding transverse plate 28 as by bolts 68.

The upper edge of each lifting plate 66 is provided with a plurality of teeth 69 with interposed diagonal notches 70 therebetween. A shorter tooth 71 is located at the receiving end of each lifting plate 66 with corresponding diagonal notch 72 interposed between the same and the first of the teeth 69.

A tooth 73 is located at the discharge end of each lifting plate 66 having the sharply inclined edge 74 merging into the less inclined edge 75 terminating in the rounded notch 76. A transversely disposed filler plate 77 is interposed between the shank portion 67 of each lifting plate and the guide plate 78, all of which are connected to the corresponding transverse plate 28 of the carriage by the bolts 68.

As shown in the drawings, each tooth 69 of the lifting plates has a vertical rear edge, and the forward edges of the teeth forming the notches 70 are inclined at a considerable angle to the horizontal, the upper portions at least thereof being located at substantially 45 degrees to the horizontal.

In contrast thereto, the notches 24 in the turn plates are located at a much less angle to the horizontal, and as shown in the drawings, are located at only about 25 degrees to the horizontal.

The upper edge of the guide plate 78 is inclined as at 79, conforming to the inclinations of the diagonal notches 70 in the lifting plate. A lift arm 80 is pivoted as at 81 upon each lifting plate 66 and is located between the corresponding lifting plate and the guide plate 79. This lift arm extends beyond the receiving end of the corresponding lift plate and terminates in the upwardly inclined end portion 82, and rounded projection 82′.

For the purpose of operating the carriage, a hydraulic unit is provided comprising a motor 83 and pump 84 operatively connected thereto and provided with reservoir 85. The pump and reservoir are connected in usual and well known manner to the double-acting hydraulic cylinder 86 pivotally mounted intermediate its ends as at 87 upon the bracket 88 supported upon the base plate 15.

The piston rod 89 of the cylinder 86 is provided with a bifurcated rod-head 90 pivotally connected as at 91 to the driving bar 63. A supply table is provided at the receiving side of the apparatus for supplying bars or billets to the machine as they come from a mill or the like.

The supply table is shown as comprising a plurality of spaced rails or bars 92 inclined downwardly toward the apparatus and supported upon uprights 93 or the like in position to convey bars or billets, as indicated at B, by gravity toward the receiving end of the apparatus.

On the opposite side of the apparatus is provided a discharge table shown as comprising a plurality of spaced rails or bars 94 inclined downwardly away from the machine and supported as on the uprights 95.

A platform 96 is supported above the discharge table 94 as upon uprights 97, in position so that a workman standing thereon is in position to examine the exposed surfaces of bars or billets located upon the turning plates 23 in order to inspect or work thereon. A shield 98 may be located in front of the platform to protect the workman from the working parts of the machine.

In the operation of the apparatus, billets or bars may be supplied to the receiving side of the apparatus by the supply table 92 which receives the billets or bars from a billet or bar mill or the like.

As shown in Figs. 5, 7 and 8, the billets or bars indicated at B, are conveyed by gravity toward the receiving end of the machine so that usually two or more billets or bars are always in contact with the uprights upon that side of the machine, and in position to be picked up by the lift arms as will be later described.

As shown in Fig. 5, the carriage 26 is in the lowered, initial or normal position. As the carriage is raised by retraction of the piston rod 89 within the cylinder 86, the lift arms 82 will pick up the endmost billets or bars on the supply table 92.

As the carriage is raised further, all except the lowermost bar or billet on the lift arms 82 will be removed from the lift arms by contact with the spring members 82a, and will fall back upon the pile of bars or billets on the supply table 92.

The lowermost bar or billet will be retained on the lift arms 82 by the projections 82' thereon, as indicated in broken lines at B in Fig. 5.

Further upward movement of the carriage to the position shown in Fig. 6 will cause the teeth 69 of the lift plates 66 to pick up the bars or billets out of the notches 24 in the turn plates 23 and start to turn them as indicated at b in Fig. 6, while the billet or bar last picked up by the lift arms 82 will start to move over the receiving end of the turn plates, as indicated at B' in Fig. 6.

Further upward movement of the carriage to the upper limit of its movement, as shown in Fig. 7, will complete the turning movement of the billets indicated at b, positioning each of them to be received in the next successive notch 24 in the turn plates when the carriage is lowered.

The foremost billet indicated at b" is thus removed from the turn plates and slides down the inclined surface 75 of the next tooth 73 of the turn plates, into the rounded notch 76 in the discharge sides thereof, as shown in Fig. 7.

The next billet b' to be picked up by the lift arms 82 will at this time be received in the notches 72 at the receiving ends of the lift plates 66. Thus, as the carriage is lowered the billet or bar B' will be received in the first notch 24 of the turn plates and the next three billets b will be received in the next three notches of the turn plates in the positions indicated in Fig. 5.

As the carriage moves back toward its lowered position, the billet b" will be released from the rounded notches 76 of the lift plates 66 and received upon the inclined rails 94 of the discharge table, as shown in broken lines in Fig. 7, where it may be discharged by gravity to any suitable station.

As shown in this broken line position, the lift arms 80 will be swung upward on their pivots 81 in order to pass the endmost billet on the supply table 92, and as the carriage again reaches its lowered, normal or initial position as shown in full lines in Fig. 5, the lift fingers 82 will have dropped back to normal position.

This operation is repeated continuously rotating the bars or billets a quarter turn with each operation of the carriage so that all longitudinal faces of the bars or billets will successively be exposed for inspection or necessary work thereon.

Although the bars or billets are shown in the drawings as of square cross section, it should be understood that the apparatus is suitable for turning bars or billets of round or other cross-sectional shape.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a plurality of toothed lift plates vertically movably mounted within the frame, the notches in the turn plates being located at a relatively slight angle to the horizontal, round-nosed projections separating said notches, the forward edges of the teeth on the lift plates being located at a relatively great angle to the horizontal and the rear edges thereof being substantially vertical and means for reciprocating the lift plates vertically only for progressively moving the billets or bars through the series of notches in the turn plates and successively turning each of the other longitudinal faces thereof upward.

2. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a plurality of toothed lift plates vertically movably mounted within the frame, the notches in the turn plates being located at a relatively slight angle to the horizontal, round-nosed projections separating said notches, the forward edges of the teeth on the lift plates being located at a relatively great angle to the horizontal and the rear edges thereof being substantially vertical and means for reciprocating the lift plates vertically only for progressively moving the billets or bars through the series of notches in the turn plates and successively turning each of the other longitudinal faces thereof upward, and means associated with the lift plates for feeding a billet or bar to the turn plates with each operation of the lift plates.

3. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a plurality of toothed lift plates vertically movably mounted within the frame, the notches in the turn plates being located at a relatively slight angle to the horizontal, round-nosed projections separating said notches, the forward edges of the teeth on the lift plates being located at a relatively great angle to the horizontal and the rear edges thereof being substantially vertical and means for reciprocating the lift plates vertically only for progressively moving the billets or bars through the series of notches in the turn plates and successively turning each of the other longitudinal faces thereof upward, and means upon the lift plates for removing a billet or bar from the turn plates with each operation of the lift plates.

4. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a plurality of toothed lift plates vertically movably mounted within the frame, the notches in the turn plates being located at a relatively slight angle to the horizontal, round-nosed projections separating said notches, the forward edges of the teeth on the lift plates being located at a relatively great angle to the horizontal and the rear edges thereof being substantially vertical and means for reciprocating the lift plates vertically only for progressively moving the billets or bars through the series of notches in the turn plates and successively turning each of the other longitudinal faces thereof upward, means associated with the lift plates for feeding a billet or bar to the turn plates with each operation of the lift plates, and means upon the lift plates for removing a billet or bar from the turn plates with each operation of the lift plates.

5. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a plurality of toothed lift plates vertically movably mounted within the frame, and means for vertically reciprocating the lift plates for progressively moving the billets or bars through the series of notches in the turn plates and successively turning each of the other longitudinal faces thereof upward, and pivoted lift arms associated with the lift plates for feeding a billet or bar to the turn plates with each operation of the lift plates.

6. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a plurality of toothed lift plates vertically movably mounted within the frame, and means for vertically reciprocating the lift plates for progressively moving the billets or bars through the series of notches in the turn plates and successively turning each of the other longitudinal faces thereof upward, pivoted lift arms associated with the lift plates for feeding a billet or bar to the turn plates with each operation of the lift plates, and means upon the lift plates for removing a billet or bar from the turn plates with each operation of the lift plates.

7. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a plurality of toothed lift plates vertically movably mounted within the frame, and means for vertically reciprocating the lift plates for progressively moving the billets or bars through the series of notches in the turn plates and successively turning each of the other longitudinal faces thereof upward, pivoted lift arms associated with the lift plates for feeding a billet or bar to the turn plates with each operation of the lift plates, and a supply table at one side of the frame for supplying billets or bars one at a time to said lift arms.

8. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a plurality of toothed lift plates vertically movably mounted within the frame, the notches in the turn plates being located at a relatively slight angle to the horizontal, round-nosed projections separating said notches, the forward edges of the teeth on the lift plates being located at a relatively great angle to the horizontal and the rear edges thereof being substantially vertical and means for reciprocating the lift plates vertically only for progressively moving the billets or bars through the series of notches in the turn plates and successively turning each of the other longitudinal faces thereof upward, and means upon the lift plates for removing a billet or bar from the turn plates with each operation of the lift plates, and a discharge table at one side of the frame for receiving billets or bars from said lift plates as they are removed from said turn plates.

9. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a plurality of toothed lift plates vertically movably mounted within the frame, and means for vertically reciprocating the lift plates for progressively moving the billets or bars through the series of notches in the turn plates and successively turning each of the other longitudinal faces thereof upward, pivoted lift arms associated with the lift plates for feeding a billet or bar to the turn plates with each operation of the lift plates, a supply table at one side of the frame for supplying billets or bars one at a time to said lift arms, and a discharge table at the other side of the frame for receiving billets or bars from said lift plates as they are removed from said turn plates.

10. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a carriage vertically movably mounted within the frame, a plurality of toothed lift plates mounted upon said carriage, the notches in the turn plates being located at a relatively slight angle to the horizontal, round-nosed projections separating said notches, the forward edges of the teeth on the lift plates being located at a relatively great angle to the horizontal and the rear edges thereof being substantially vertical and means for reciprocating said carriage vertically only for progressively moving the billets or bars through the series of notches in the turn plates and successively turning each of the other longitudinal faces thereof upward.

11. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a carriage vertically movably mounted within the frame, a plurality of toothed lift plates mounted upon said carriage, the notches in the turn plates being located at a relatively slight angle to the horizontal, round-nosed projections separating said notches, the forward edges of the teeth on the lift plates being located at a relatively great angle to the horizontal and the rear edges thereof being substantially vertical and means for reciprocating said carriage vertically only for progressively moving the billets or bars through the series of notches in the turn plates and successively turning each of the other longitudinal faces thereof upward, and means associated with the lift plates for feeding a billet or bar to the turn plates with each operation of the carriage.

12. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a carriage vertically movably mounted within the frame, a plurality of toothed lift plates mounted upon said carriage, the notches in the turn plates being located at a relatively slight angle to the horizontal, round-nosed projections separating said notches, the forward edges of the teeth on the lift plates being located at a relatively great angle to the horizontal and the rear edges thereof being substantially vertical, means for reciprocating said carriage vertically only for progressively moving the billets or bars through the series of notches in the turn plates and successively turning each of the other longitudinal faces thereof upward, and means upon the lift plates for removing a billet or bar from the turn plates with each operation of the lift plates.

13. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a carriage vertically movably mounted within the frame, a plurality of toothed lift plates mounted upon said carriage, the notches in the turn plates being located at a relatively slight angle to the horizontal, round-nosed projections separating said notches, the forward edges of the teeth on the lift plates being located at a relatively great angle to the horizontal and the rear edges thereof being substantially vertical, means for reciprocating said carriage vertically only for progressively moving the billets or bars through the series of notches in the turn plates and successively turning each of the other longitudinal faces thereof upward, means associated with the lift plates for feeding a billet or bar to the turn plates with each operation of the carriage, and means upon the lift plates for removing a billet or bar from the turn plates with each operation of the lift plates.

14. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a carriage vertically movably mounted within the frame, a plurality of toothed lift plates mounted upon said carriage, means for vertically reciprocating said carriage for progressively moving the billets or bars through the series of notches in the turn plates and successively turning each of the other longitudinal faces thereof upward, pivoted lift arms associated with the lift plates for feeding a billet or bar to the turn plates with each operation of the carriage, and means upon the lift plates for removing a billet or bar from the turn plates with each operation of the lift plates.

15. Apparatus for turning billets and bars having angularly arranged connected longitudinal faces, said apparatus comprising an elongated frame comprising spaced pairs of uprights, transversely disposed turn plates connected to the upper ends of said uprights, each turn plate having a similar series of notches in its upper edge adapted to receive billets or bars with one longitudinal face thereof upward, a carriage vertically movably mounted within the frame, a plurality of toothed lift plates mounted upon said carriage, means for vertically reciprocating said carriage for progressively moving the billets or bars through the series of notches in the turn plates and successively turning each of the other longitudinal faces thereof upward, pivoted lift arms associated with the lift plates for feeding a billet or bar to the turn plates with each operation of the carriage, and means upon the lift plates for removing a billet or bar from the turn plates with each operation of the lift plates, a supply table at one side of the frame for supplying billets or bars one at a time to said lift arms, and a discharge table at the other side of the frame for receiving billets or bars from said lift plates as they are removed from said turn plates.

References Cited in the file of this patent

UNITED STATES PATENTS

| | | |
|---|---|---|
| 816,323 | Hellstrom | Mar. 27, 1906 |
| 1,448,425 | Worthington | Mar. 13, 1923 |

FOREIGN PATENTS

| | | |
|---|---|---|
| 402,873 | Italy | Mar. 27, 1943 |